(12) United States Patent
McLeod et al.

(10) Patent No.: US 6,625,964 B2
(45) Date of Patent: Sep. 30, 2003

(54) HYDRAULIC DRIVE LINE AND HITCHING ASSEMBLY FOR PULL-TYPE IMPLEMENTS

(75) Inventors: Robert H. McLeod, Winnipeg (CA); Brent Evashenko, Winnipeg (CA); David A. Young, Winnipeg (CA)

(73) Assignee: McLeod Harvest Inc., Winnipeg (CA)

(*) Notice: Subject to any disclaimer, the term of this patent is extended or adjusted under 35 U.S.C. 154(b) by 3 days.

(21) Appl. No.: 09/774,030

(22) Filed: Jan. 31, 2001

(65) Prior Publication Data

US 2002/0069629 A1 Jun. 13, 2002

(30) Foreign Application Priority Data

Dec. 8, 2000 (CA) .............................................. 2327994

(51) Int. Cl.[7] .......................... A01D 69/03; A01D 41/04; A01D 67/00
(52) U.S. Cl. .......................... 56/11.9; 56/14.9; 56/218; 56/DIG. 14; 172/677; 280/492
(58) Field of Search ................................ 56/11.9, 14.9, 56/15.1, 16.7, DIG. 11, DIG. 14, 218; 172/677, 679, 680; 280/492, 493, 494

(56) References Cited

U.S. PATENT DOCUMENTS

| | | | |
|---|---|---|---|
| 2,609,929 A | 9/1952 | King ........................... 209/135 |
| 3,224,560 A | 12/1965 | Jarvis ........................... 198/64 |
| 3,460,698 A | 8/1969 | Harris ........................... 214/519 |
| 3,580,257 A | 5/1971 | Teague ........................... 130/24 |
| 3,665,685 A | * 5/1972 | Allard ........................... 56/10.4 |
| 4,018,036 A | 4/1977 | Cicci et al. ........................... 56/1 |
| 4,018,294 A | 4/1977 | Rankins et al. ............... 180/13 |
| 4,060,167 A | 11/1977 | Smith ........................... 198/622 |
| 4,411,038 A | 10/1983 | Mukai ........................... 15/3.13 |
| 4,467,818 A | 8/1984 | Donaldson et al. ............ 130/27 |
| 4,515,686 A | 5/1985 | Janich ........................... 209/139 A |
| 4,669,674 A | 6/1987 | Oldengott et al. ....... 241/101.7 |
| 4,838,358 A | 6/1989 | Freudendahl ................ 172/125 |
| 4,936,978 A | 6/1990 | Bortnikov et al. ............. 209/10 |
| 5,025,616 A | 6/1991 | Moss ........................... 56/14.9 |
| 5,146,737 A | * 9/1992 | Gantzer ........................ 56/14.9 |
| 5,203,154 A | 4/1993 | Lesher et al. ................. 56/366 |
| 5,339,907 A | * 8/1994 | Roth ........................... 172/107 |
| 5,462,131 A | 10/1995 | Eidam et al. ................ 180/14.4 |
| 5,503,712 A | 4/1996 | Brown ........................ 162/55 |
| 5,531,283 A | 7/1996 | Austin et al. ................ 180/53.1 |
| 5,544,475 A | * 8/1996 | Skibo ........................... 56/15.5 |
| 5,706,901 A | 1/1998 | Walters et al. ............... 172/439 |

(List continued on next page.)

FOREIGN PATENT DOCUMENTS

| | | |
|---|---|---|
| AU | A-71759/96 | 11/1996 |
| CA | 638 703 | 3/1962 |
| CA | 1053528 | 5/1979 |
| CA | 1047876 | 6/1979 |

(List continued on next page.)

OTHER PUBLICATIONS

U.S. patent application Ser. No. 09/590,186, McLeod et al., filed Jun. 9, 2000.

(List continued on next page.)

*Primary Examiner*—Thomas B. Will
*Assistant Examiner*—Nathan Mammen (57) ABSTRACT

A hydraulic drive apparatus for powering mechanical components of a pull-type implement, such as a crop harvesting unit, having an elongated extending hitching arm for pivotal attachment to a powered vehicle provided with a power take-off shaft. The drive apparatus includes a hydraulic pump for attachment to the hitching arm, a mechanical drive shaft for operation of the hydraulic pump upon attachment of the drive shaft to the power take-off shaft of the powered vehicle, and connections for hydraulic fluid lines for delivery and return of hydraulic fluid to and from a hydraulic motor for operation of the mechanical components of the pull-type crop harvester. The apparatus may include an articulation assembly to isolate the drive for the pump from movements between the hitching arm and the vehicle.

8 Claims, 9 Drawing Sheets

U.S. PATENT DOCUMENTS

| | | | |
|---|---|---|---|
| 5,794,423 A | 8/1998 | McLeod | 56/14.6 |
| 5,795,222 A | 8/1998 | McLeod | 460/97 |
| 5,873,226 A | 2/1999 | McLeod | 56/14.6 |
| 6,119,789 A * | 9/2000 | Taylor | 172/439 |

FOREIGN PATENT DOCUMENTS

| | | |
|---|---|---|
| CA | 1094904 | 3/1981 |
| CA | 1112975 | 11/1981 |
| CA | 2247070 | 3/2000 |
| DE | 1 952 567 | 6/1971 |
| DE | 23 49 176 | 4/1975 |
| DE | 2 650 617 | 5/1978 |
| DE | 35 404 93 | 11/1985 |
| DE | 3528638 A1 | 2/1987 |
| EP | 0 406 961 | 2/1990 |
| EP | 0 678 236 | 4/1995 |
| EP | WO 00/76294 | 12/2000 |
| FR | 1010545 | 6/1952 |
| FR | 1 447 739 | 9/1965 |
| FR | 70.28195 | 7/1970 |
| GB | 888 814 | 2/1962 |
| GB | 1 255 045 | 11/1971 |
| GB | 1 583 983 | 4/1977 |
| GB | 2 021 527 | 4/1979 |
| GB | 1 568 565 | 6/1980 |
| GB | 1 583 983 | 2/1981 |
| GB | 2 338 880 A | 7/1998 |
| GB | 2 338 880 | 7/1998 |
| SU | 1036293 A | 8/1983 |
| SU | 1261579 A1 | 10/1986 |
| SU | 1496684 A1 | 7/1989 |

OTHER PUBLICATIONS

U.S. patent application Ser. No. 09/590,362, McLeod et al., filed Jun. 9, 2000.

Product Specification on New Holland Company, unclear whether Jan. 3, 2000 or Mar. 1, 2000.

* cited by examiner

HYDRAULIC DRIVE LINE AND HITCHING ASSEMBLY FOR PULL-TYPE IMPLEMENTS

BACKGROUND OF THE INVENTION

1. Field of the Invention

This invention relates to hitching assemblies for agricultural implements of the pull-type (i.e. implements that are not self-propelled and usually not provided with an internal power source), by means of which such implements are attached to driven vehicles, e.g. tractors. More particularly, the invention relates to hitching assemblies that are capable of supplying hydraulic power to the mechanical elements of such implements.

2. Description of the Prior Art

The applicant herein has already disclosed a novel method of and apparatus for harvesting grain and seed crops that provide an alternative to the use of conventional combine harvesters. In this regard, reference is made to U.S. Pat. No. 5,794,423 issued on Aug. 18, 1998; U.S. Pat. No. 5,795,222 issued on Aug. 18, 1998; and U.S. Pat. No. 5,873,226 issued on Feb. 23, 1999 filed in the name of Robert H. McLeod.

A conventional combine harvester operates by carrying out all of the harvesting steps in the field on a continuous basis. The crop plants are cut, the cut plants are threshed to separate grain (or seeds such as peas, etc.), chaff and (inevitably) weed seeds from the stalks, the grain is then cleaned by separating it from the chaff and weed seeds, the grain is delivered to a waiting collection vehicle, and the stalks, chaff and weed seeds are returned to the field. The disadvantages of this are that (a) combine harvesters are very expensive to purchase and to operate; (b) they are not very efficient at cleaning the grain, so some grain is lost and/or further grain cleaning is required; and (c) chaff and weed seeds are returned to the field, so that their economic value is lost and weeds proliferate.

The concept underlying the systems disclosed in the above patents is that, instead of attempting to carry out all of the harvesting steps in the field, only the step of threshing and removing stalks is carried out, and the remaining product (a mixture of grain, chaff and weed seeds—referred to by the coined word "graff") is collected and transported to a fixed grain cleaning site. The advantage of this is that the harvesting equipment may be less complicated and expensive than a conventional combine harvester, the cleaning of the grain may be carried out more efficiently at a fixed site, the economic value of the chaff and weed seeds may be realized, and the need for herbicides is reduced (because the weed seeds are collected rather than being returned to the field).

The harvester employed in such a system may be of the pull-type, i.e. it may lack a motor or other propulsion means, and may simply be towed behind a powered vehicle, such as a conventional tractor, on undriven wheels. This can result in a considerable reduction of cost and improve maneuverability. However, a harvester of this kind still requires power to drive the cutting, threshing and conveying equipment, etc., and this may be supplied by a mechanical (rotary) drive line coupled to the conventional power take-off (PTO) of a farm vehicle and extending along a hitching arm used to pull the harvester behind the vehicle. When this is done, the mechanical drive line must be provided with joints (e.g. universal joints, constant velocity joints, etc.) that allow the rotating drive line to follow the contour of the hitching arm (for example, the arm may be of inverted generally U-shape to extend above the harvesting head of the harvesting unit), and that allow the hitching arm to pivot on the powered vehicle at one end and the harvesting unit at the other end. Such an arrangement is described in Applicant's (as yet unpublished) U.S. patent application Ser. Nos. 09/590,362 and 09/590,186, filed on Jun. 9, 2000, and corresponding PCT application PCT/CA00/00679 filed on the same date.

While this is effective, the mechanical drive can generate a significant amount of vibration and noise, due to the many joints that are required and the large angles at which the joints may have to operate during turning of the vehicle or realignment of the harvesting unit relative to the vehicle. This also lead to rapid wear of the mechanical drive line. It would therefore be advantageous to provide an alternative way of transferring power to a harvester of this kind that minimizes or avoids such vibration, noise and wear.

Additionally, when using a hitching arm of the above kind, the mechanical drive line must usually undergo a sharp change of direction adjacent to the power take-off. The shaft of the power take-off is normally horizontal and faces outwardly from the rear of the vehicle. The hitching arm, however, extends generally upwardly from the hitch point, so the drive line must undergo a 90° change of angle (or other sharp turn) to follow the contour of the hitching arm. At this very point (i.e. the hitch point), the equipment must accommodate large relative movements between the hitching arm and the vehicle as the harvesting unit can swing from side to side and tends to undergo rocking and bouncing during use. The use of conventional rotary direction-change devices (universal joints, gearboxes, etc.) to achieve the sharp change of angle may make it difficult for the mechanical drive line to accommodate all of the relative movements, since such devices often operate only through limited variations of angle.

Moreover, there are similar types of pull-type agricultural implements, e.g. machines that simply cut plants, such as disc mowers and windrowers, that would also benefit from the replacement or partial replacement of mechanical drive lines while still providing a means of transferring power from a driven unit to a towed (pull-type) implement.

SUMMARY OF THE INVENTION

An object of the present invention is to provide an alternative drive line for a pull-type crop harvesting unit, or other towed (pull-type) agricultural or other implement, that reduces or eliminates the vibration, noise and wear encountered when mechanical (rotary) drive lines are used for this purpose.

Another object of the invention is to provide a drive line that can readily accommodate all of the likely movements between the powered vehicle and an adjacent hitching arm used for pulling a crop harvester or other towed implement while following the contour of such a hitching arm.

According to one aspect of the invention, there is provided hydraulic drive apparatus comprising an elongated hitching arm for pivotal attachment at one end to a powered vehicle provided with a power take-off shaft and for attachment at an opposite end thereof to a pull-type agricultural implement having driven mechanical components, a hydraulic pump attached to said hitching arm adjacent to said one end, a rotatable drive shaft for actuation of said hydraulic pump upon attachment of said drive shaft to said power take-off shaft of said powered vehicle, hydraulic fluid lines for delivery and return of hydraulic fluid from and to said hydraulic pump for operation of said mechanical elements, and an articulated hitching assembly provided at said one end of said hitching arm for connection of said hitching arm to said powered vehicle, said assembly substantially isolating said rotatable drive shaft from movements of said hitching arm relative to said powered vehicle.

The mechanical drive shaft preferably has a first part for attachment to the power take-off shaft and a second part extending to the hydraulic pump, the first and second parts being coupled to each other at their adjacent ends with their longitudinal axes unaligned, the coupling being via a direction change device supported by the articulation assembly.

In the above apparatus, the direction change device is preferably a gearbox.

The direction change device (e.g. a gearbox) is preferably supportable by the articulation assembly at a preferred attitude relative to the power take-off shaft and relative to the hydraulic pump, and this preferred attitude is preferably maintained substantially unchanged during the movements of the hitching arm relative to the powered vehicle.

The articulation assembly preferably comprises an elongated plate for attachment to a draw bar of the powered vehicle at one end and having upstanding flanges at an opposite end, a cradle element pivotally supported between the upstanding flanges, the cradle having elongated cradle flanges extending from one end thereof, and a support unit (e.g. a housing) for the direction change device, the support unit being pivotally supported between the cradle flanges and also independently pivotally supportable from the hitching arm. The articulation assembly permits articulation about three mutually orthogonal axes, i.e. rolling, yawing and pitching. Most preferably, these three axes cross at a common point located at the center of the direction change device.

The articulation assembly may alternatively comprise a reel-shaped element for attachment to a draw bar of a powered vehicle, a saddle-shaped element surrounding said reel-shaped element and rotatable thereon, said saddle-shaped element having upstanding flanges provided with aligned bores, a pin extending through said bores of said saddle-shaped element, a hollow elongated housing having forwardly projecting lower side pieces pivotally connected to said saddle-shaped element via said pin, a cylindrical downwardly projecting element forming an end part of said hitching arm, and a bearing for rotatably attaching said housing to said cylindrical downwardly projecting element for rotation of said housing about said end element.

According to another aspect of the invention, there is provided a mobile agricultural implement of the pull-type having a body containing or supporting mechanical components, a hydraulic motor for operating said mechanical components, and an elongated hitching arm with opposite lateral ends extending from said body and pivotally connected at one end to the body and connectable at an opposite end to a rear portion of a powered vehicle, said hitching arm supporting a hydraulic drive apparatus for powering said hydraulic motor, said drive apparatus comprising a hydraulic pump attached to said hitching arm adjacent to an end of said arm remote from said agricultural implement, a rotatable drive shaft for operation of said hydraulic pump upon attachment of said drive shaft to said power take-off shaft of said powered vehicle, hydraulic fluid lines for delivery and return of hydraulic fluid between said hydraulic pump and said hydraulic motor, and an articulated hitching assembly for connection between said powered vehicle and said hitching arm for substantially isolating said rotatable drive shaft from movements of said hitching arm relative to said powered vehicle.

According to another aspect of the invention, there is provided an agricultural implement of the pull-type having a mobile body containing or supporting mechanical components for acting on a plant crop, a hydraulic motor for operating said mechanical components, and an elongated extending hitching arm with opposite lateral ends for pivotal connection at one end to the body and at an opposite end to a rear portion of a powered vehicle, said hitching arm carrying a hydraulic drive line for driving said hydraulic motor as a sole means of driving said mechanical components. According to another aspect of the invention, there is provided an articulation assembly for an equipment drive line, for connection between a powered vehicle and an elongated hitching arm used for pulling a harvesting unit by the powered vehicle, the articulation assembly comprising a direction change device for the drive line causing the drive line to change direction at the device, an elongated plate for attachment to a draw bar of the powered vehicle at one end and having upstanding flanges at an opposite end, a cradle element pivotally supported between the upstanding flanges, the cradle having elongated cradle flanges extending from one end thereof, and a support unit for the direction change device, the support unit being pivotally supported between the cradle flanges and also independently pivotally supportable from the hitching arm.

According to yet another aspect of the invention, there is provided, in a mobile harvesting apparatus comprising a harvesting unit of the pull-type containing or supporting mechanical components for cutting and processing a crop, a hydraulic motor for operating the mechanical components, an elongated extending hitching arm with opposite lateral ends for pivotal connection at one end to the harvester body and at an opposite end to a powered vehicle, and a drive line following the hitching arm for transferring power from the powered vehicle to the mechanical components of the harvesting unit, wherein the improvement comprises the use of a hydraulic drive line as the exclusive means of transferring the power from the vehichle to the mechanical components of the harvesting unit.

According to yet another aspect of the invention, there is provided an articulated hitching assembly for connection between a powered vehicle and an elongated hitching arm used for pulling an agricultural implement by said powered vehicle, said articulated hitching assembly comprising a first element for attachment to a draw bar of said powered vehicle, a second element pivotally attached to said first element for rotation about a first axis, and a third element pivotally attached to said second element for rotation about a second axis, and a pivotable connection for pivotal attachment of said third element to an adjacent end of said hitching arm permitting pivotal attachment of said third element to said hitching arm about a third axis.

By the term "power take-off" (PTO) we mean a rotatable drive shaft provided on a tractor or other vehicle for the purpose of providing a source of mechanical power to ancillary equipment used in farming or the like. The PTO is usually provided with some kind of coupling for attachment to a driven shaft and is often partially or fully surrounded by a protective collar to prevent injury. The PTO is often connected to a main motor of the vehicle, often through a clutch or interrupter. The PTO shaft usually projects at right angles from the vehicle body facing to the rear.

The invention, at least in its preferred forms, makes it possible to provide power to the mechanical elements of a pull-type agricultural implement, such as a harvesting unit, without substantial noise, vibration and wear. The preferred articulation assembly isolates the mechanical drive for the hydrostatic pump from movements of the vehicle and hitching arm. The resulting assembly is self-contained (all the elements required for the hydraulic drive are attached to the hitching arm), merely requiring attachment to the ubiquitous power take-off of farm vehicles. The articulation assembly (which functions as a movement isolation device) allows a hydraulic (hydrostatic) pump to be mounted rigidly on the hitching arm without risk of damage from mis-alignments of the drive shaft used to power the pump caused by relative motion between the hitching arm and the vehicle.

DETAILED DESCRIPTION OF THE PREFERRED EMBODIMENTS

While farmers in recent years have become used to self-propelled combine harvesters for harvesting grain, the inventions of U.S. Pat. Nos. 5,794,423, 5,795,222 and 5,873,226 relating to the harvesting of "graff" have rejuvenated interest in the use of unpowered so-called "pull-type" harvesting units, which are generally much less expensive to construct. Moreover, most farmers already own suitable propulsion vehicles, e.g. tractors, for pulling such harvesting units.

An improved harvesting unit, particularly suited to the harvesting of "graft", may be based in part on the concept of providing a pull-type unit having a design allowing towing of the harvesting unit directly behind a powered vehicle, e.g. a tractor. However, this creates a problem in that, if the harvesting unit is towed behind a tractor, there is difficulty in providing a suitable means of attachment between the two since the harvesting header (particularly a direct-cut header) is necessarily positioned immediately behind the tractor hitch point, making a conventional tow bar impossible to use and blocking access to the tractor's mechanical and hydraulic power supplies. The header also has a cutter bar that must be raised, and this imposes a further constraint on any towing system. This difficulty may be overcome by providing a harvesting unit having an elongated hitching arm that is raised at its center to pass over the harvesting header. Such an arrangement intended for the harvesting of "graff" is the subject of Applicant's co-pending (as yet unpublished) patent applications mentioned above, but is nevertheless briefly described below to facilitate an understanding of the present invention.

Figure 1:
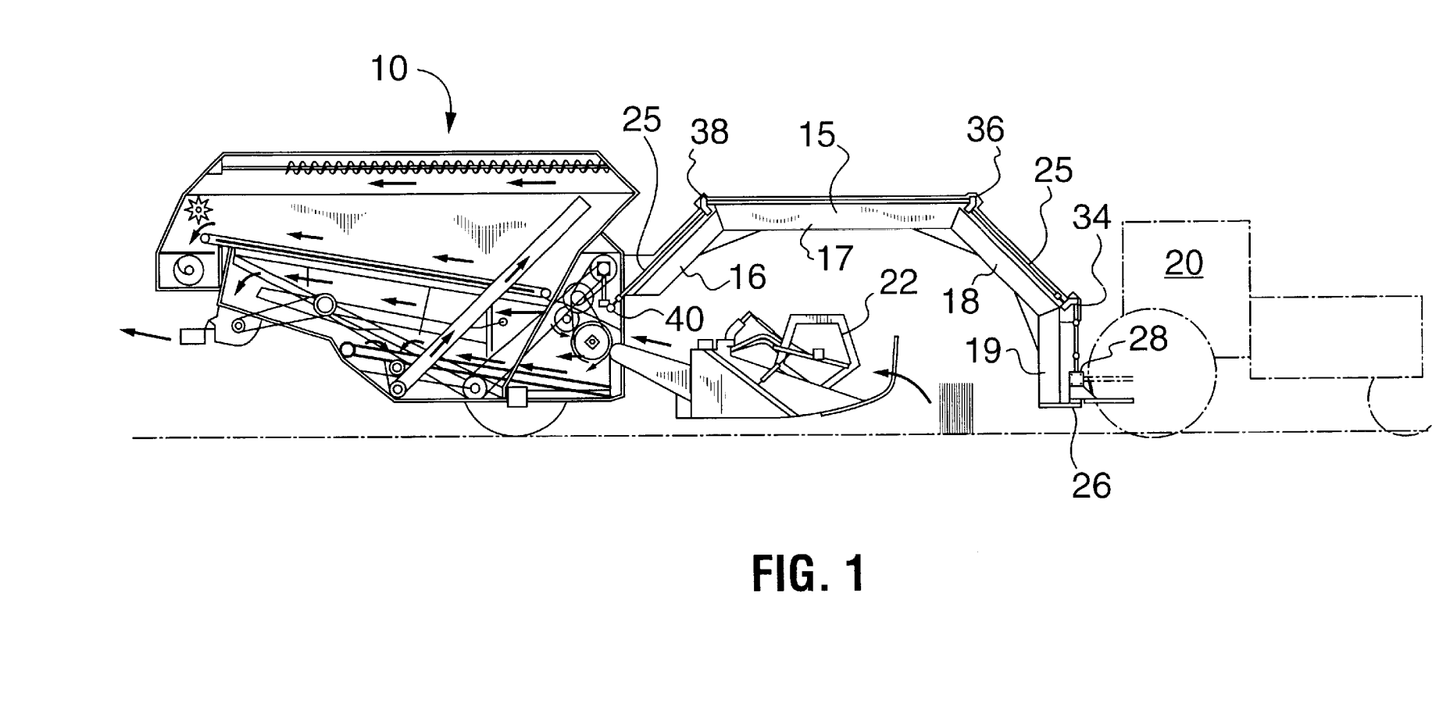
FIG. 1 is a side elevation, partly in cross-section, of a harvesting unit and hitching arm provided with one possible kind of mechanical drive for operating the mechanical systems of the unit, shown for comparison with the present invention.

FIG. 1 is a side view of an embodiment of such a harvesting unit 10 having an attached hitching arm 15. The hitching arm 15 is made up of four sections 16, 17, 18 and 19. Section 19 is a vertical section at the tractor end of the hitching arm (the tractor 20 being shown in dotted lines). The hitching arm 15 is approximately of inverted U-shape and provides good "headroom" above a harvesting header 22 to allow the header to be raised fully to the inactive position, and also to allow room for the harvesting header in the operational position during swinging of the harvester unit 10 out from one side of the tractor 20 or the other.

The harvesting unit 10 is unpowered but contains mechanical systems for cutting, conveying and threshing the crop, as can be seen from the drawing. These systems are powered by a mechanical (rotary) drive line 25 which is supported by the hitching arm 15 and closely follows the contours of the hitching arm. This routing, as well as the relative movement between the tractor 20, hitching arm 15 and harvesting unit 10, and any slight flexing of the hitching arm during use, must be accommodated without adverse consequences to the mechanical drive line. This may best be done by providing U-joints (universal or constant velocity joints) at the points where the drive line 25 bends to follow the shape of the hitching arm, and also by providing slip joints (e.g. splined telescopic sections) within the driveline itself to accommodate lengthening and shortening actions of the line.

At the point of attachment of the hitching arm 15 to the tractor 20, a ball joint 26 is provided to allow sharp turns of the hitching arm 15 from side to side, and a gearbox 28 may be bolted to the tractor body to accommodate the abrupt change of direction of the mechanical drive line 25 at this position.

The harvesting unit is steered relative to the tractor by actuations of hydraulic cylinders (not shown, but see FIG. 6) acting between the body of the harvesting unit and an adjacent part of the hitching arm at opposite sides of the arm.

While this arrangement is effective, it will be seen that quite a large number of rotary joints 34, 36, 38, 40, as well as the gearbox 28, must be provided in the mechanical driveline 25 and this can result in vibration, noise and wear, not to mention a high cost of construction. Moreover, relative movements outside the range that can be accommodated by these joints can result in serious damage to the driveline. The purpose of the present invention is to obviate such problems and disadvantages by fully or partially replacing this mechanical driveline with an alternative power supply for the mechanical equipment of the harvesting unit, that minimizes vibration, noise and preferably wear and cost, and by providing a novel hitching assembly that makes such a replacement practical.

In the present invention, at least in preferred forms thereof, power is conveyed from a powered vehicle to a towed harvesting unit, or similar agricultural implement, by means of hydraulic instead of mechanical couplings to avoid vibration, noise and wear. While many farm vehicles have auxiliary hydraulic (hydrostatic) pumps that may be used to power a towed harvesting unit with the necessary hydraulic lines (hoses) routed along or through the hitching arm, not all farm vehicles do, and those that do may not have pumps of the necessary output capacity for driving most or all of the mechanical equipment of the implement. Moreover, if auxiliary pumps within a vehicle are used for this purpose, the hydraulic lines (or at least certain stretches of the lines) must be sufficiently flexible to accommodate the movement that occurs between the hitching arm and the vehicle or harvesting unit, despite the fact that conventional hydraulic lines are often quite inflexible.

Applicants have now overcome this problem by providing apparatus that allows the conventional mechanical power take-off (PTO) shaft of a tractor or other powered farm vehicle to be used to power a hydraulic system for driving the entire mechanical elements of a harvesting unit, or similar implement, while adequately accommodating necessary relative movements between the different parts of the equipment.

Most preferably, this is achieved by providing a rotary mechanical coupling between the PTO and a hydraulic (hydrostatic) pump in order to allow the PTO to drive the pump and to generate hydraulic fluid under pressure which is then conveyed via hydraulic lines across or through the hitching arm to a hydraulic motor for reconverting hydraulic power to mechanical movement. In this way, the mechanical drive line may be entirely (or mainly) eliminated, while the equipment will be widely usable with a variety of powered vehicles and towed vehicles available for farm use.

Surprisingly, it has been found particularly preferable and advantageous to support the hydraulic pump on the hitching arm rather than on the body of the powered vehicle, and to arrange for the hydraulic pump to be driven from the PTO by a short rotary driveline. This allows free access to the PTO using the usual type of shaft-to-shaft coupling, and enables the relative movement between the driven vehicle and the hitching arm to be accommodated through mechanical joints rather than via flexing of the hydraulic lines. The hydraulic lines then convey the power to the harvesting unit along or through the hitching arm. However, this means that the hitching assembly, by means of which the powered vehicle is attached to the hitching arm, must be capable not only of accommodating expected multi-directional movements between the vehicle and hitching arm, but also of restricting the range of movements flexing movements to which the short rotary driveline is subjected, otherwise the short rotary driveline will be damaged.

Figure 2:
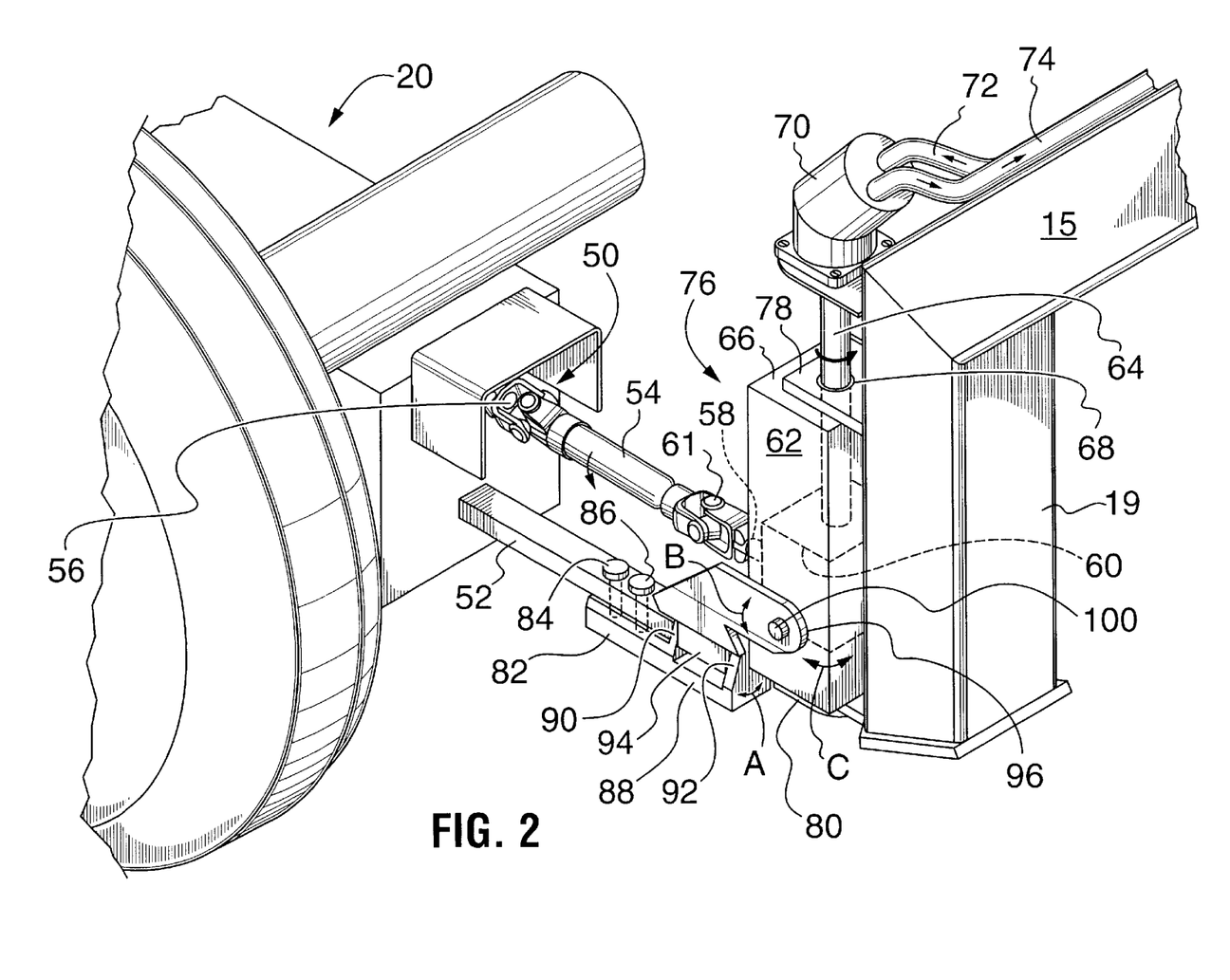
FIG. 2 is a partial perspective view of a hydraulic drive apparatus according to a preferred form of the present invention, also showing a tractor PTO next to a rear tractor wheel, and an adjacent end of a hitching arm.
Figure 3:
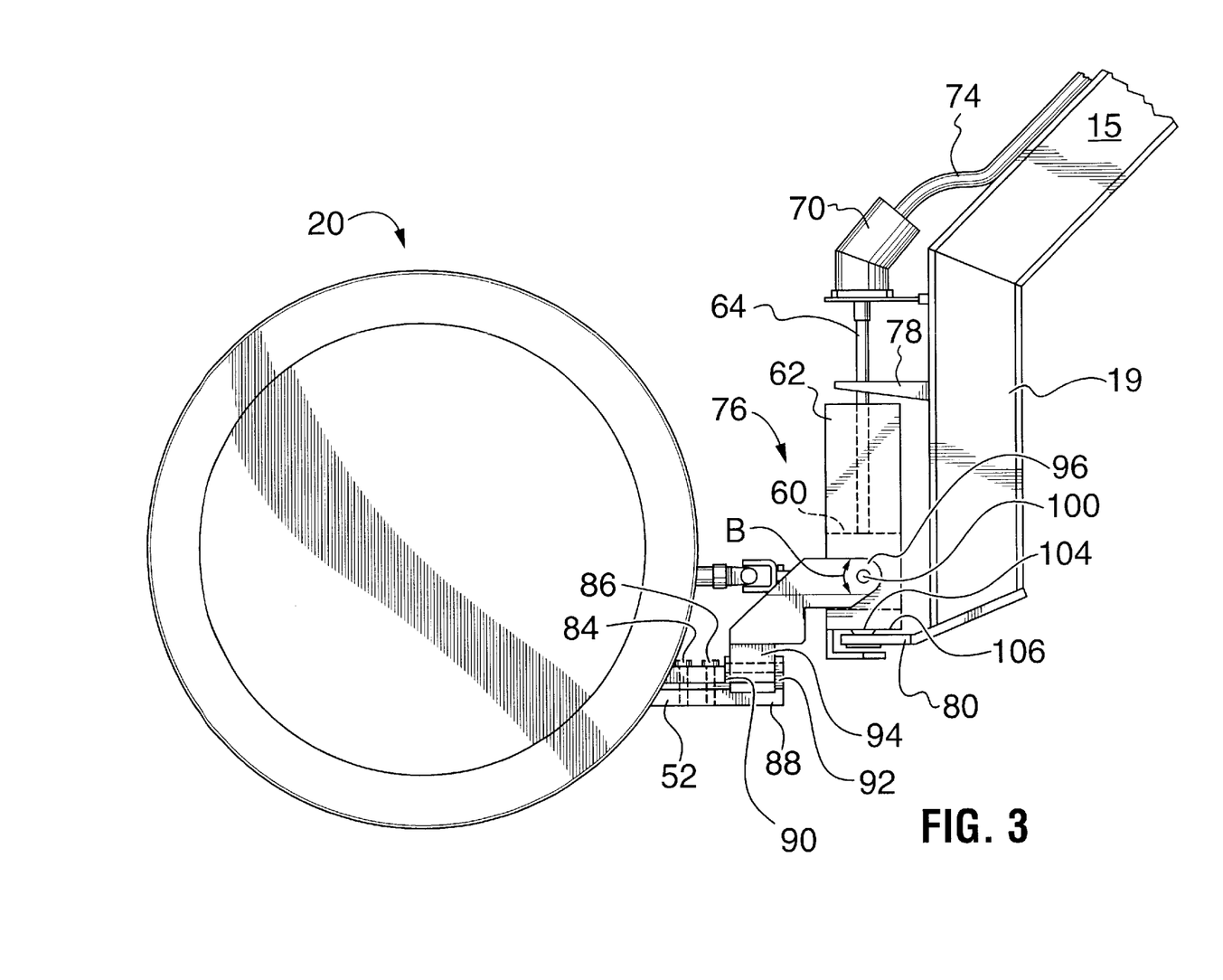
FIG. 3 is a side elevation of the apparatus of FIG. 2.
Figure 4:
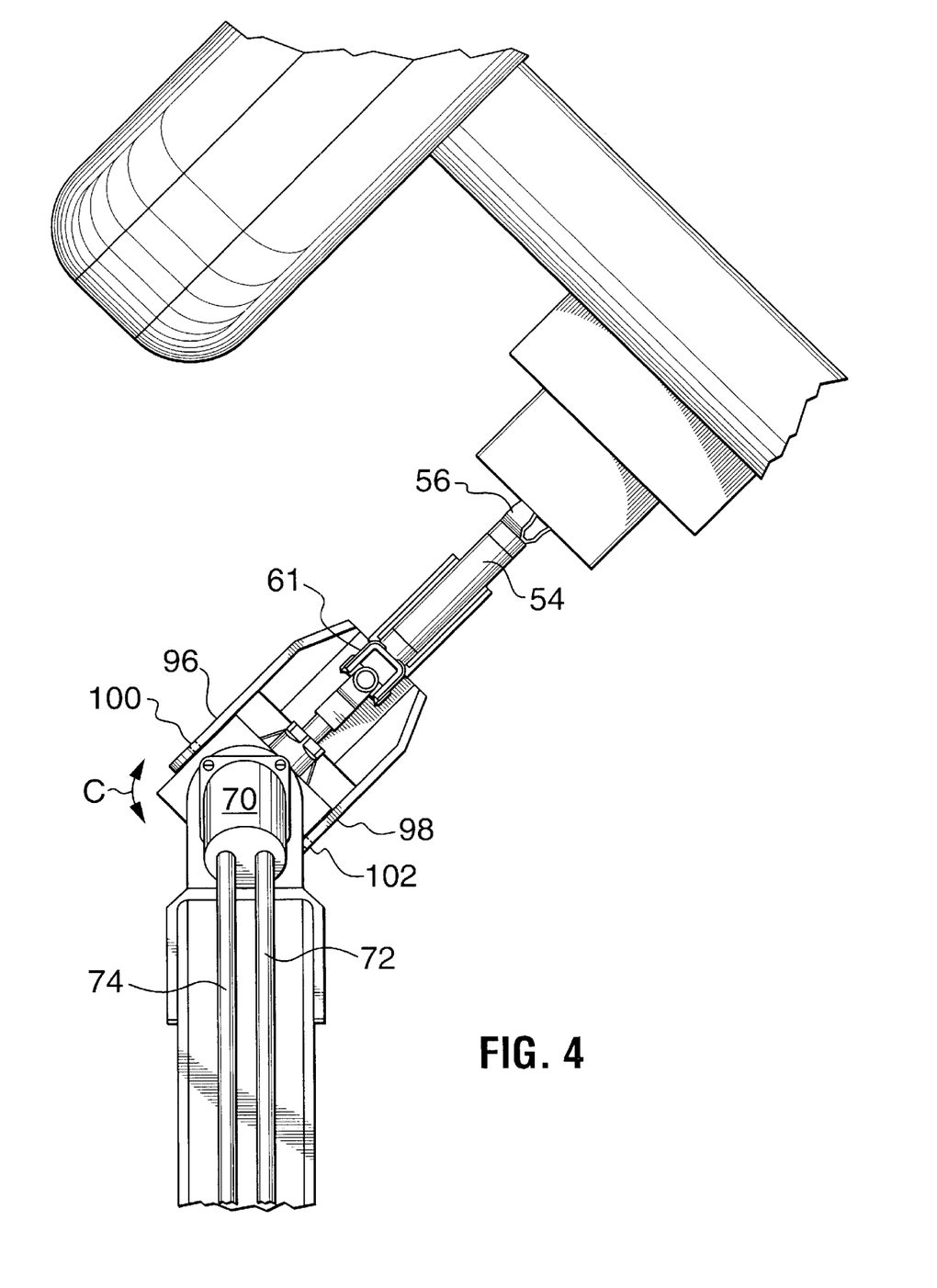
FIG. 4 is a top plan view of the apparatus of FIG. 2 and FIG. 3, showing the hitching arm pivoted at a sharp angle to the PTO of the tractor.

A preferred arrangement of this kind is shown in FIGS. 2, 3 and 4 of the accompanying drawings.

FIG. 2 is a perspective view showing a lower rear region of a tractor 20 or other powered vehicle (the remainder of the vehicle is not shown) around a power take-off point (PTO) 50 and a fixed drawbar 52 forming a conventional tractor hitch point. The PTO is in the form of a stub shaft that is driven by a motor (not shown) within the tractor to rotate about its longitudinal axis. A shaft 54, forming a first part of a short mechanical drive shaft, is attached at one end to the PTO 50 via a universal (constant velocity) joint 56 acting as an articulation element within the mechanical drive shaft, and at the other end to a stub shaft 58 of a gearbox 60 via a second universal joint 62 forming a second articulation element in the mechanical drive shaft. The gearbox 60, which acts as a direction change device (i.e. a device that creates a change of direction (90°) in the short mechanical drive shaft), is positioned within and attached to a rectangular housing 62 that acts as a first support for the gearbox. The gearbox 60 has a shaft 64 emerging from the gearbox at right angles to stub shaft 58. The shaft 64 extends upwardly through the housing 62 along the longitudinal axis thereof and emerges from the top face 66 of the housing 62 through hole 68. The shaft at its upper end enters a hydrostatic pump 70 that is firmly attached to a harvester hitch 15 of the type shown in FIG. 1. The shaft 64, as it rotates, drives the pump 70 (which is preferably a bent axis piston pump, but could be of any other type) that generates hydraulic fluid under pressure. The hydraulic fluid is delivered to the harvester unit (not shown here, but see FIG. 5) via hydraulic fluid line 72 and is returned at low pressure via hydraulic fluid line 74 (as shown by the arrows).

During normal operation of the apparatus, the hitching arm 15 moves in relation to the tractor 20 (by pivoting about the drawbar 52)) and this movement must be accommodated without damaging the short mechanical driveline from the PTO 50 to the hydrostatic pump 70. For this reason, the hitching arm is connected to drawbar 52 on the tractor via a special articulated hitching assembly 76 and, additionally, the housing 62 (which forms part of the hitching assembly 76) is mounted for rotation on the vertical end part 19 of the hitching arm 15 about a vertical axis via brackets 78 and 80 extending from the front face of the vertical end portion 19.

The articulated hitching assembly consists of an elongated plate 82 which attaches rigidly to the drawbar 52 via two pins 84 and 86. A rear portion 88 at a distal end extends beyond the rear end of the drawbar 52 and has upstanding flanges 90 and 92 that form a pivotal support for a cradle unit 94 of the hitch. The cradle unit 94 may rock from side to side along a horizontal front-to-rear axis as shown by double headed arrow A. The cradle unit 94 itself has rearwardly extending cradle flanges 96 and 98 that form pivotal supports for pins 100 and 102 that extend from the sides of housing 62. The cradle flanges 96 and 98 and pins 100 and 102 permit front-to-rear rocking of the housing 62 as shown by double headed arrow B. As already noted, the housing is also pivotally attached to the hitching arm 15 via supports 78 and 80. The lower support is effected via a pin 104 extending from the lower face 106 of the housing, and at the top, the shaft 64 itself acts as a pivot pin. This arrangement forms a second support for the gearbox 60 and allows pivoting about a vertical axis as shown by the double headed arrow C (see FIG. 4). This gimbal-like multi-axis support arrangement (which allows pivoting around three mutually orthogonal axes) enables the gearbox 60 to maintain a substantially constant (fixed) attitude (i.e. facing relationship) relative to the PTO 50 and at the same time to the hydraulic pump 70 (two fixed elements located on different relatively movable units, i.e. the tractor and the hitching arm) throughout all of the relative motion likely to be encountered at the point of connection of the hitching arm 15 to the tractor 20, thus allowing the short mechanical drive shaft extending from the PTO to the hydrostatic pump to function without damage or undue wear (the short mechanical drive shaft being made up of shaft 54, gearbox 60, shaft 64, joints 56 and 62, etc.). The articulated hitching assembly is nevertheless strong enough to transmit force from the tractor 20 to the harvesting unit 10 without damage during normal use. Without this accommodation or relative movement, the universal joints 56 and 58 would not themselves be able to accommodate the full range of movement between the hitching arm 15 and the tractor 20 because joints of this kind have a limited angle through which they can operate without damage.

As already noted, the illustrated equipment effectively allows rotation about all three orthogonal axes at the point where the hitching arm 15 is attached to the drawbar 52, while also avoiding the need for modification of the conventional PTO 50 or the hitching arm 15. There is little vibration, noise and wear within this arrangement and the hydraulic oil lines do not have to flex at all (they can be securely attached to the top of the hitching arm 15 or may pass through the hollow interior).

At the other end of the hitching arm 15 where it connects with the harvesting unit, the relative movement between the hitching arm and the harvesting unit may be accommodated by making appropriate stretches of the hydraulic fluid lines 72 and 74 suitably flexible (e.g. by providing high pressure elastomeric tubing). Alternatively, a gimbaled hitch unit similar to the one already described may be located between the rear end of the hitching arm and a connector on the harvesting unit. In this case, a hydrostatic motor is attached to the rear of the hitching arm and a driven shaft extending therefrom connects to a main driven shaft on the harvester unit via a stub shaft having universal (constant velocity) joints. This would avoid the need for flexible hydraulic oil lines at that position, but would increase the cost of the equipment.

Figure 5:
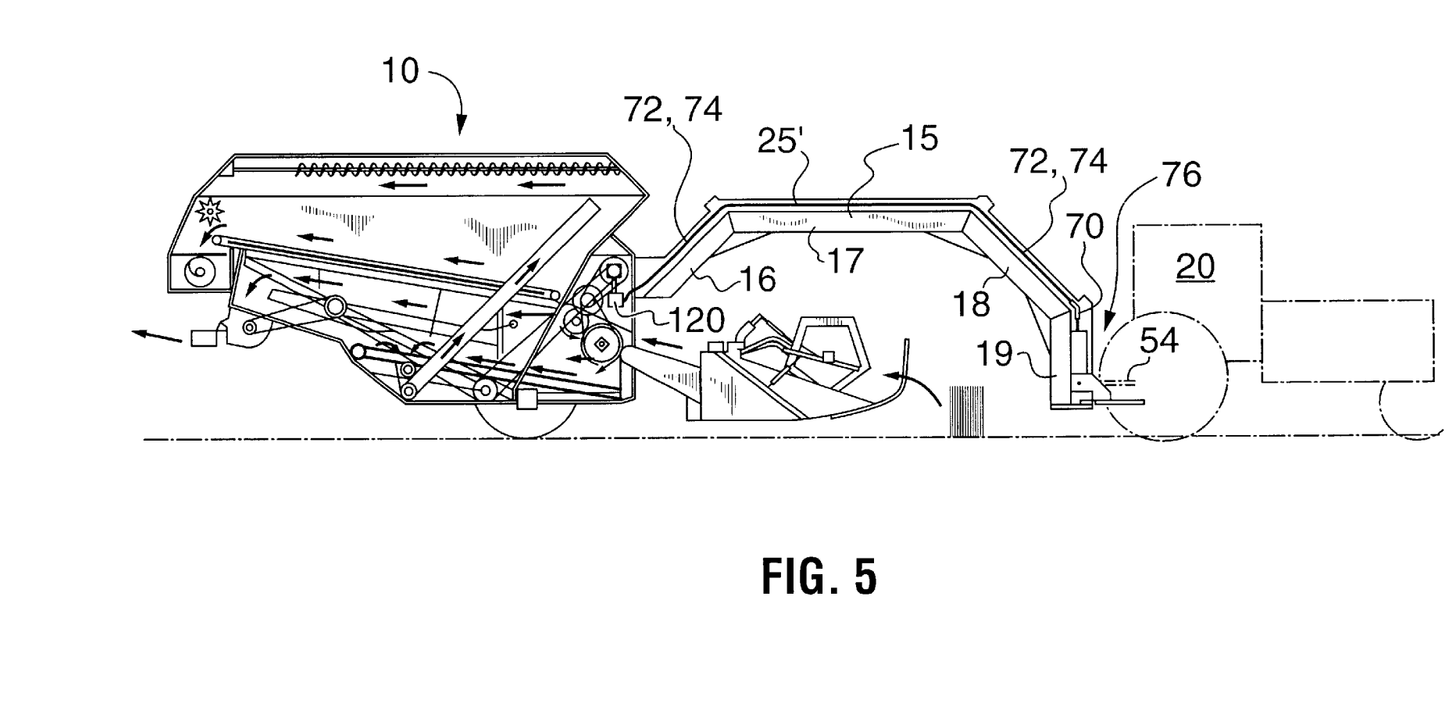
FIG. 5 is a side view of a harvesting unit and hitching arm, similar to that of FIG. 1, but showing a preferred embodiment of the present invention.

FIG. 5 is a view similar to FIG. 1, but showing the elimination of the mechanical driveline 25 and its replacement with a hydraulic driveline 25' including the mechanical coupling 54 to the PTO, articulated hitching assembly 76, hydrostatic pump 70, and hydraulic fluid lines 72, 74 of the embodiments of FIGS. 2, 3 and 4, together with a hydraulic motor 120 within the body of the harvesting unit 10 connected to and driving the mechanical equipment.

Figure 6:
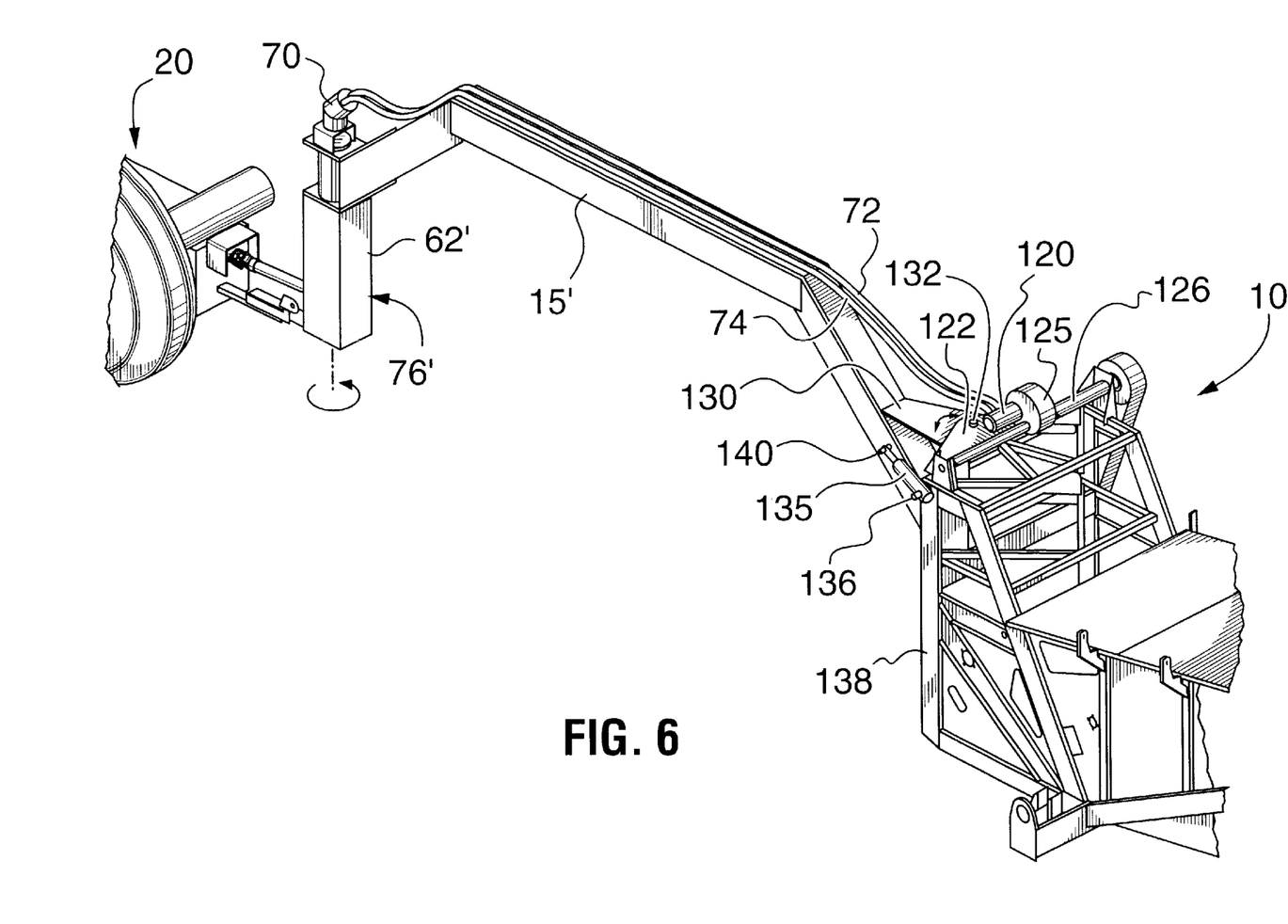
FIG. 6 is a perspective view of a hitching arm and hydraulic drive line according to another preferred embodiment of the invention showing immediately adjacent parts of a tractor at one end and a harvesting unit at the other end of the arm.

FIG. 6 shows a slightly modified hitching arm 15' extending between a tractor 20 and harvesting unit 10. Only essential parts of the tractor and harvesting unit are shown. The arrangement at the tractor end of the hitching arm is generally as shown in FIGS. 2 to 5, except that, as part of a modified articulated hitching assembly 76', the housing 62' replaces the upright final section 19 of the hitching arm 19 rather than being rotatably mounted on the final section 19 as in the earlier embodiments. The housing 62' in nevertheless rotatable about a vertical axis and the hydraulic pump 70 is fixed.

The hydraulic fluid is conveyed to and from the hydraulic pump 70 over the top of the hitching arm 15' by hydraulic fluid lines 72 and 74 as in the previous embodiments. The lines 72 and 74 connect to a hydraulic motor 120 secured to part of the body of the harvesting unit, i.e. flange 122. The motor 120 has a driven shaft (not visible) that enters a gearbox 125 that drives a main shaft 126 of the harvesting unit. The main shaft 126 drives all of the mechanical apparatus of the harvesting unit, including the main threshing cylinder, the beater, feeder house, straw chopper, straw walkers and graff conveying system, using standard axles, pulleys, belts, etc.

The hitching arm 15' has a plate 130 extending therefrom and this is pivoted at point 132 to the flange 122 so that the arm may rotate relative to the harvesting unit at this point. One of the hydraulic cylinders used for steering the harvesting unit is shown at 135 (there is another equivalent cylinder on the other side of the arm, but it is not visible in this drawing). The cylinder 135 extends from a pivot point 136 on a frame member 138 forming part of the body of the harvesting unit to a pivot point 140 on the side of the hitching arm. These cylinders may be powered by hydrostatic pump 70, but are usually powered from a separate hydraulic circuit driven by auxiliary hydraulic pumps in the tractor 20. In this case, the hitching arm 15 guides and supports a further set of hydraulic lines (not shown) leading to the cylinders 135. When cylinder 135 is extended and the other one on the other side is contracted, the harvesting unit and the hitching arm are caused to pivot relative to each other. Contraction of this cylinder and expansion of the other one causes pivoting in the opposite direction. This steering action is controlled from the tractor 20 by suitable controls (not shown) and it allows the harvesting unit 10 to be swung out on one side of the tractor or the other, or alternatively to be drawn in line with the tractor, for efficient crop harvesting.

An alternative embodiment of an articulated hitching assembly for attachment of a hitching arm to a vehicle is shown in FIGS. 7 to 10.

Figure 7:
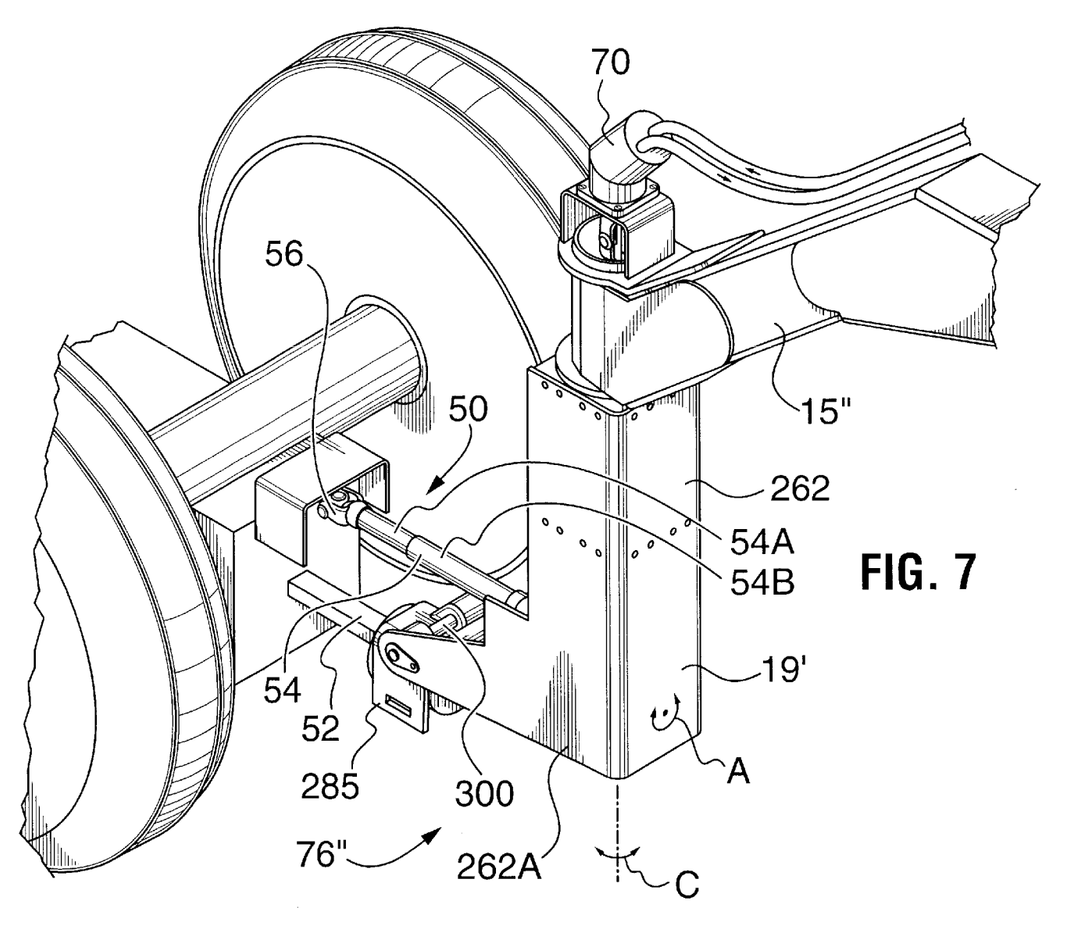
FIG. 7 is a view similar to that of FIG. 2, but showing an alternative embodiment of the invention.
Figure 8:
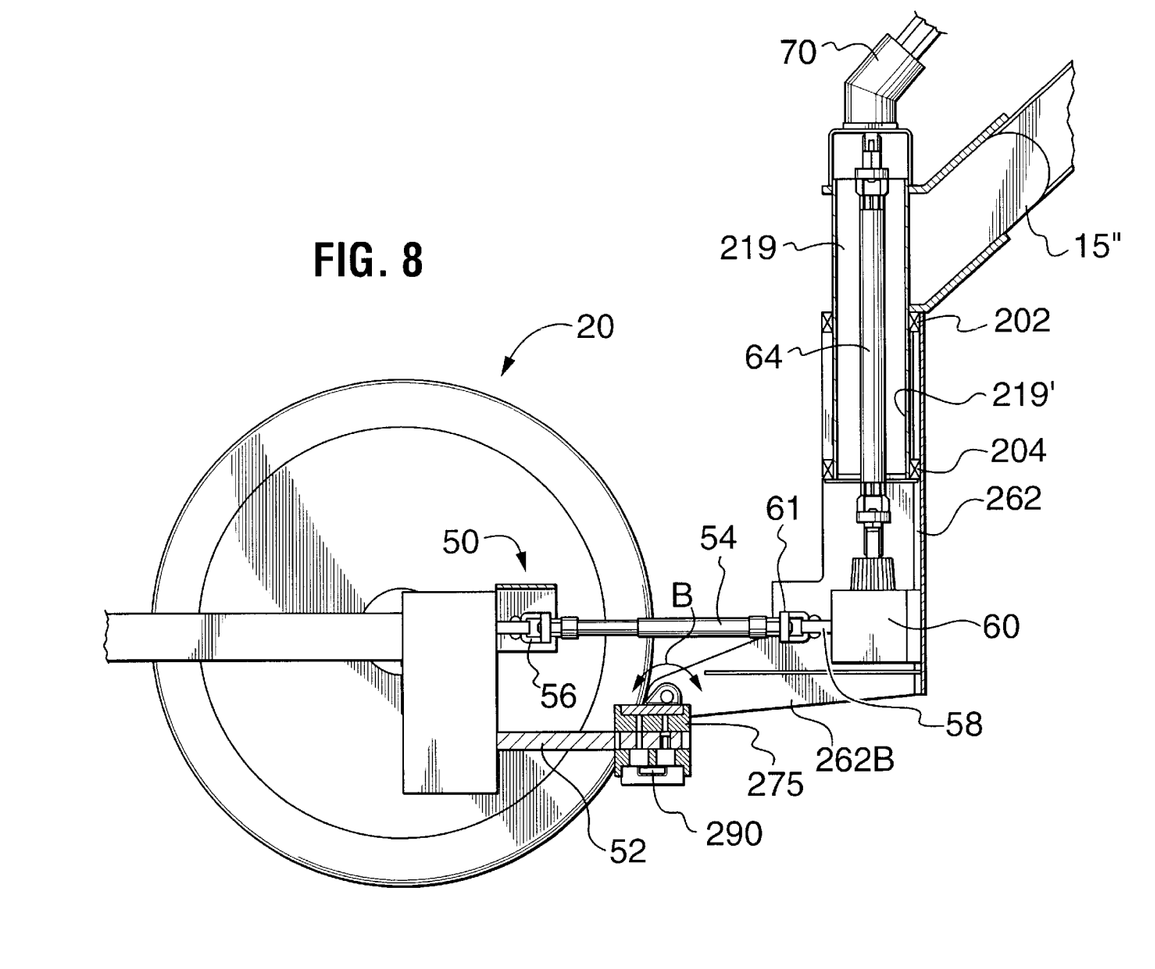
FIG. 8 is a vertical longitudinal cross-section of the alternative embodiment of FIG. 7.

In this embodiment, as in FIG. 6, an articulated hitching assembly 76" is incorporated into an upright section 19' of a hitching arm 15". As will be seen from FIG. 8, this is achieved by rigidly attaching an upright hollow cylindrical member 219 to the end of the hitching arm 15", and enclosing a downwardly projecting lower end 219' of the cylindrical member within a housing 262, the housing being rotatable about the projecting lower end 219' by virtue of upper and lower bearings 202 and 204 which allow the housing 262 to rotate around the lower end 219' through 360°. The lower part of the housing 262 is open at the side facing the tractor 20 (only relevant parts of which are shown, the remainder being conventional) and has a pair of forwardly-projecting side pieces 262A and 262B which are connected to the tractor draw bar 52 in the manner discussed in more detail later. The tractor 20 is provided with a conventional PTO 50 and, as in previous embodiments, a shaft 54 is connected to the PTO 50 via a universal joint 56. As shown, the shaft 54 may be made of two parts 54A and 54B that are telescoped together to allow variable length, the parts having mating splines that prevent mutual rotation. The distal end of the shaft 54 is attached via a second universal joint 62 to a stub shaft 58 of a gearbox 60 securely fixed to the interior of the housing 262. The gearbox 60 acts to change the direction of the short mechanical drive through 90°, as in previous embodiments, and has an upright shaft 64 which extends from the top of the gearbox, axially through the cylindrical member 219 to a hydraulic pump 70, which functions in the manner previously described.

As the hitching arm 15" swivels from side to side relative to the tractor 20, the attitude of the gearbox 60 relative to the PTO 50 remains the same by virtue of the rotation that takes place between the upright cylindrical member 219 and the housing 262 as shown by the double headed arrow C shown in FIG. 7. The universal joints 56 and 62 consequently do not have to accommodate any (or much) misalignment due to such swiveling motion.

Figure 9:
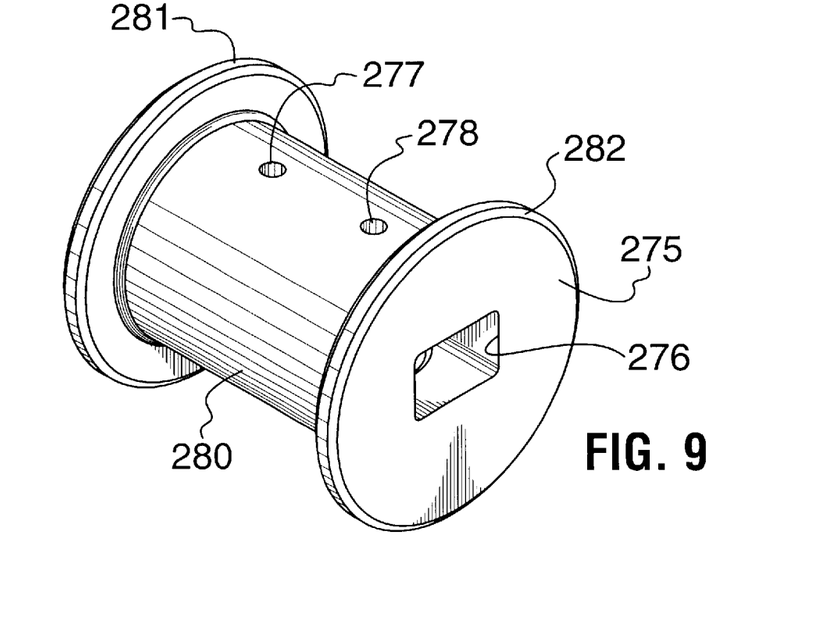
FIG. 9 is a perspective view of a first component used in the embodiment of FIGS. 7 and 8.

In the embodiment of FIGS. 7 to 10, the assembly forming the attachment to the draw bar 52 differs from the previous embodiments, although the same relative motion is accommodated. First of all, a reel-shaped element 275 as shown in isolation in FIG. 9 is fitted on to the free end of the draw bar 52 with the rectangular draw bar passing through the axial rectangular channel 276 in the element 275. The reel-shaped element 275 is fixed to the draw bar 52 by a pair of bolts (not shown) which pass through the reel-shaped element from below, through holes in the draw bar (see FIG. 8) and terminate in threaded holes 277 and 278 in the upper end of the reel-shaped element. The lower side of the reel-shaped element may be open to accommodate the positioning of these bolts (see FIG. 8). The reel-shaped element 275, fixed to the draw bar 52, has a cylindrical outer surface 280 that acts as part of a bearing. The axially inner and outer ends of the element 275 are provided with enlarged collars 281 and 282 that act as stops, as described later.

Figure 10:
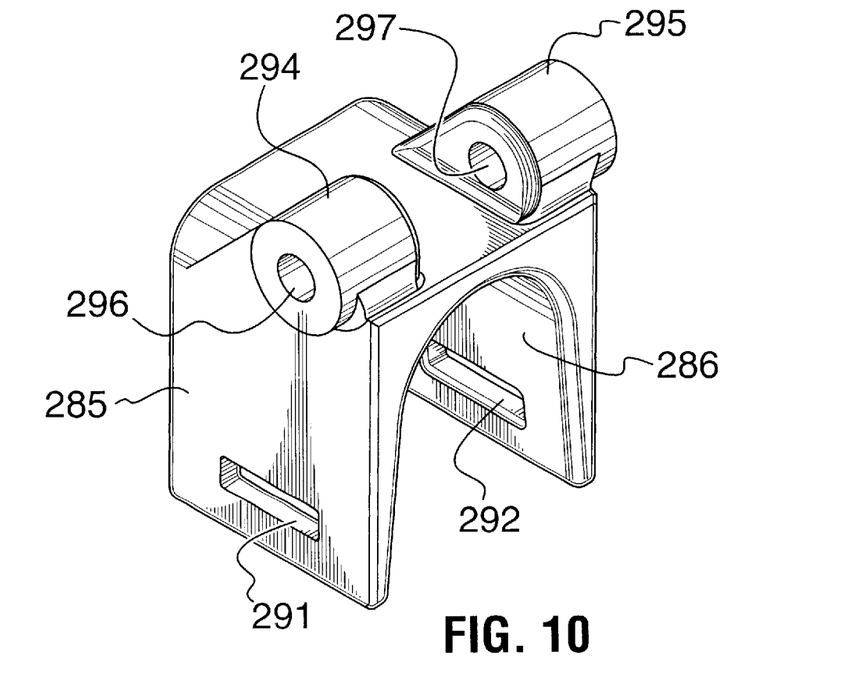
FIG. 10 is a perspective view of a second component used in the embodiment of FIGS. 7 and 8.

A second part of the bearing is formed by the saddle-shaped element 285 shown in isolation in FIG. 10. This sits on the reel-shaped element 275 with an inverted U-shaped surface 286 in contact with the cylindrical outer surface 280 of the reel-shaped element 275 so that the saddle-shaped element 285 may rotate about the central longitudinal axis of the reel-shaped element 275. The enlarged collars 281 and 282 of the reel-shaped element 275 engage the end surfaces of the saddle-shaped element 285 and thus act as stops that prevent longitudinal (front-to-rear) motion of the saddle-shaped element with respect to the reel-shaped element. The saddle-shaped element is retained in position on the reel-shaped element by a rectangular pin 290 (see FIG. 8) which passes through rectangular slots 291 and 292 in the saddle-shaped element 285 beneath the reel-shaped element 275. The rotation of the saddle-shaped element around the reel-shaped element permits rotation of the hitching arm 15" relative to the tractor 20 as shown by double-headed arrow A in FIG. 7.

The saddle-shaped element 285 has upstanding part-cylindrical flanges 294 and 295. The flanges have aligned cylindrical bores 296 and 297 that receive a cylindrical pin 300 (see FIG. 7) serving to pivotally attach the forwardly projecting side pieces 262A and 262B to the saddle-shaped element 285. This pivotal attachment allows rotation indicated by double-headed arrow B in FIG. 8. The assembly thus permits rotation of the hitching arm 15" about three orthogonal axes indicated by double headed arrows A, B and C, as in previous embodiments. However, the embodiment of FIGS. 7 to 10 has an advantage over the previous embodiments, in that pivot pin 300 is located beneath shaft 54 at exactly the central point of the shaft 54 (see FIG. 8). Rotation indicated by arrow B causes the shaft angles (the angles through which universal joints 56 and 62 must move to allow such pivoting) to be equal at both ends of the shaft. This causes less wear and vibration at the universal joints.

Incidentally, while the articulated hitching assembly 76, 76' or 76" is particularly useful when used in the equipment shown in FIGS. 2 to 6, 7 and 8 having a hydraulic pump 70 fixed securely to the hitching arm 15 or 15', essentially the same assembly may be used with a mechanical drive line of the type shown in FIG. 1. The assembly then replaces the mechanical components below the first joint 34 (which remains). This has the advantage that relative movements between the hitching arm and the tractor cause less flexing of the mechanical drive line, so that less strain is exerted on the U-joints, etc., at this location.

Furthermore, the articulated hitching assembly may alternatively be without drive shaft 54, gearbox 60, upright shaft 64 and hydraulic pump 70 merely to attach a pull-type implement (of any kind) to a vehicle via a hitching arm. The three axes of rotation permitted by such an assembly forms a flexible and secure means of attachment of a hitching arm to a draw bar of a vehicle.

While preferred embodiments of the invention have been described in detail above, it will be appreciated by person skilled in the art that various modifications and alterations thereof may be made without departing from the scope of the invention as defined by the following claims.

What we claim is:

1. A hydraulic drive apparatus comprising an elongated hitching arm for pivotal attachment at one end to a powered vehicle provided with a power take-off shaft and for attachment at an opposite end thereof to a pull-type agricultural implement having driven mechanical components, a hydraulic pump attached to said hitching arm adjacent to said one end, a rotatable drive shaft for actuation of said hydraulic pump upon attachment of said drive shaft to said power take-off shaft of said powered vehicle, hydraulic fluid lines for delivery and return of hydraulic fluid from and to said hydraulic pump for operation of said mechanical elements, and an articulated hitching assembly provided at said one end of said hitching arm for connection of said hitching arm to said powered vehicle, said assembly substantially isolating said rotatable drive shaft from movements of said hitching arm relative to said powered vehicle, wherein the articulated hitching assembly comprises a reel-shaped element for attachment to a draw bar of a powered vehicle, a saddle-shaped element surrounding said reel-shaped element and rotatable thereon, said saddle-shaped element having upstanding flanges provided with aligned bores, a pin extending through said bores of said saddle-shaped element, a hollow elongated housing having forwardly projecting lower side pieces pivotally connected to said saddle-shaped element via said pin, a cylindrical downwardly projecting element forming an end part of said hitching arm, and a bearing for rotatably attaching said housing to said cylindrical downwardly projecting element for rotation of said housing about said end part.

2. The apparatus of claim 1, wherein a horizontal part of said rotatable drive shaft extends above said reel-shaped and saddle-shaped elements and a vertical part of said rotatable drive shaft extends through said housing to said hydraulic pump.

3. The apparatus of claim 2, wherein said pin is positioned beneath a center of said horizontal part of said rotatable drive shaft.

4. The apparatus of claim 2, wherein said housing encloses a direction change device for said rotatable drive shaft between said horizontal and vertical parts thereof.

5. A mobile agricultural implement of the pull-type having a body containing or supporting mechanical components, a hydraulic motor for operating said mechanical components, and an elongated hitching arm with opposite lateral ends extending from said body and pivotally connected at one end to the body and connectable at an opposite end to a rear portion of a powered vehicle, said hitching arm supporting a hydraulic drive apparatus for powering said hydraulic motor, said drive apparatus comprising a hydraulic pump attached to said hitching arm adjacent to an end of said arm remote from said agricultural implement, a rotatable drive shaft for operation of said hydraulic pump upon attachment of said drive shaft to said power take-off shaft of said powered vehicle, hydraulic fluid lines for delivery and return of hydraulic fluid between said hydraulic pump and said hydraulic motor, and an articulated hitching assembly for connection between said powered vehicle and said hitching arm for substantially isolating said rotatable drive shaft from movements of said hitching arm relative to said powered vehicle, wherein the articulated hitching assembly comprises a reel-shaped element for attachment to a draw bar of a powered vehicle, a saddle-shaped element rotatably supported by and at least partially surrounding said reel-shaped element, said saddle-shaped element having upstanding projections provided with aligned bores, a pin extending through said bores, a hollow elongated housing having forwardly projecting lower sides pivotally connected to said saddle-shaped element via said pin, a cylindrical downwardly projecting element forming an end part of said hitching arm, and a bearing for rotatably attaching said housing to said cylindrical downwardly projecting element for rotation of said housing about said projection.

6. The apparatus of claim 5, wherein a generally horizontal part of said rotatable drive shaft extends above said reel-shaped and saddle-shaped elements and a generally vertical part of said rotatable drive shaft extends through said housing to said hydraulic pump.

7. The apparatus of claim 6, wherein said pin is positioned beneath a center of said horizontal part of said rotatable drive shaft.

8. The apparatus of claim 6, wherein said housing encloses a direction change device for said rotatable drive shaft.

* * * * *